United States Patent Office 3,136,764
Patented June 9, 1964

3,136,764
TETRAHALOCYCLOPENTADIENYLDIAMINE COMPOUNDS
Earl T. McBee, Lafayette, Ind., assignor to Purdue Research Foundation, West Lafayette, Ind., a corporation of Indiana
No Drawing. Filed Mar. 24, 1961, Ser. No. 98,028
11 Claims. (Cl. 260—247.5)

This invention relates to compositions of matter classified in the art of chemistry as substituted hexahalocyclopentadienes and to processes for the preparation of such compositions.

The invention sought to be patented, in its composition aspect, is described as residing in the concept of chemical compounds having a molecular structure in which there is attached to a 1,2,3,4-tetrahalocyclopentadiene nucleus two secondary amino moieties in the 5-position of the said nucleus.

The invention sought to be patented, in its process aspect, resides in the concept of embodying such molecular structures in tangible form by reacting hexahalocyclopentadiene with a secondary amine.

The tangible embodiments of this invention are colorless crystalline compounds melting in the range from slightly above room temperature, for the lower members, and upwards. They are useful as chemical intermediates and in the prevention of certain plant diseases due to their inherent fungicidal properties, as demonstrated by their use in controlling the early blight of tomatoes and damping-off of peas.

The manner and process of making and using this invention is illustrated by the following general description and examples, which set forth the best mode contemplated by me of carrying out the invention so as to enable any person skilled in the art of chemistry to make and use the same:

The novel compounds of the present invention may be illustrated by the formula

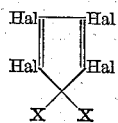

wherein Hal represents a halogen and wherein X represents a secondary amine moiety. The nature of these products will appear more fully from the discussion of the process which follows.

The gem-diamino compounds of this invention are prepared by the reaction of hexahalocyclopentadiene with a secondary amine according to the equation:

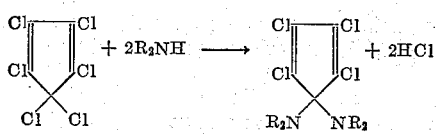

wherein R represents any organic substituent. The process gives superior results when the halogen substituent is chlorine but brominated compounds behave almost as well. Chlorine is shown as the halogen for purposes of illustration only. The two R's of R₂NH may be the same or different, or be joined to form a ring system. The only restriction on the selection of the R's is that R₂NH constitute a secondary amine. This —NR₂ represents a secondary amino moiety, abbreviated and symbolized as X herein above. The presence of competing functional groups on the secondary amino moiety will not make the present process inoperative. The reactant secondary amine will react with hexachlorocyclopentadiene as if no other functional group were present save that more hexachlorocyclopentadiene may be required to satisfy the demands of all of the reacting groups present. It cannot be too strongly emphasized that even under these unusual conditions, the ultimate product would still be a 1,2,3,4-tetrahalocyclopentadiene compound disubstituted in the 5-position by a secondary amino moiety.

As set forth above, any member of the class of secondary amines is suitable for the practice of this invention. Since the definition and extent of the class is well known to those skilled in the art of chemistry, it would be pointless to attempt to illustrate all of the possible varieties of secondary amines known and capable of use in the process of the present invention. However, di-lower-alkylamines, diphenylamines, N - phenyl - lower-alkyl-amines, morpholines, piperidines, and pyrrolidines are particularly suited for the practice of this invention. Thus compounds having the formulas shown above wherein X or NR₂ is a di-lower-alkylamino, a diphenyl-amino, an N-phenyl-lower-alkylamino, an N-morpholino, an N-piperidino, or an N-pyrrolidino moiety constitute the preferred compositions of this invention.

As used herein, "lower-alkyl" means those alkyl radicals containing 1 to 6 carbon atoms inclusive. Such radicals may be branched or straight chain. Typical illustrations of the lower-alkyl radicals contemplated are methyl, ethyl, propyl, isopropyl, butyl, isobutyl, pentyl, and 2,2-dimethylbutyl.

The process of this invention is most conveniently effected in the presence of an unreactive organic solvent. By "unreactive" is meant that the solvent is unreactive to the reactants, products and reaction conditions of the present process. Suitable solvents will be readily recognized by those skilled in the art as including but not limited to lower-alkyl alcohols such as methanol and ethanol, chlorinated hydrocarbons such as chloroform and carbon terachloride, and ethereal solvents such as diethyl ether. The lower-alkyl alcohols, and particularly those having less than four carbon atoms, represent a preferred class of solvents.

The conditions employed in reacting hexahalocyclopentadiene and the reactant secondary amine are not critical. Superior yields are obtained when the reaction is carried out at the temperature of the ice-bath but higher or lower temperatures may be employed. When low boiling di-lower-alkylamines are the secondary amine reactant, it may be necessary to cool the reaction mixture to prevent their volatilization. Similar results may be obtained by working in closed systems. Since the reaction is effected in the presence of a liquid solvent, only slight pressures are required at ordinary room temperatures. Improved yields are often obtained by using an excess of the secondary amine reactant with respect to hexachlorocyclopentadiene, i.e., more than two moles of secondary amine per mole of hexahalocyclopentadiene and by allowing the reactants to remain in contact with each other for long periods of time. The product is recovered from the reaction mixture and purified by conventional techniques usually by evaporation of the reaction solvent followed by solvent recrystallization of the residue.

The following examples are illustrative of the best methods of carrying out the process of the present invention known to me and of the new compounds that are prepared thereby. All temperatures are given in degrees centigrade.

EXAMPLE 1

*5,5-Dimorpholino-1,2,3,4-Tetrachlorocyclopentadiene*

Hexachlorocyclopentadiene (27.3 grams, 0.1 mole) and morpholine (34.8 grams, 0.4 mole) were mixed in 100 milliliters of methanol at zero degrees and left standing for 3 days. The crystals that formed were filtered and recrystallized from ether to give 35 grams or 94 percent of colorless product melting at 118 degrees with decomposition.

Calc'd for $C_{13}H_{16}Cl_3N_2O_2$: C, 41.70; H, 4.28; N, 7.49; Cl, 38.00. Found: C, 41.40; H, 4.23; N, 7.64; Cl, 38.08.

Recrystallization of the above compound from ether containing excess morpholine gave crystals of 5,5-dimorpholino-1,2,3,4-tetrachlorocyclopentadiene melting at 135 degrees.

Found: C, 41.45; H, 4.40; N, 7.63; Cl, 38.00.

Hydrolysis of the isomorphs of this example with 20 percent aqueous sulfuric acid gave the known tetrachlorocyclopentadienone dimer in 73 percent yield.

EXAMPLE 2

*5,5-Dipiperidino-1,2,3,4-Tetrachlorocyclopentadiene*

Piperidine (34.0 grams, 0.4 mole) and hexachlorocyclopentadiene (27.3 grams, 0.1 mole) were added to 100 milliliters of methanol at zero degrees. After 24 hours' standing, the crystals that formed were filtered and washed with methanol. Recrystallization from ether gave 34 grams or 92 percent colorless crystals melting at 108 degrees with decomposition.

Calc'd for $C_{15}H_{20}Cl_4N_2$: C, 48.65; H, 5.41; Cl, 38.38; N, 7.58. Found: C, 48.68; H, 5.72; Cl, 36.49; N, 7.63.

Recrystallization of the above material from ether containing some excess piperidine gave colorless crystals of 5,5-dipiperidino-1,2,3,4-tetrachlorocyclopentadiene melting at 116 degrees also with decomposition.

Hydrolysis of the isomorphs of this example with aqueous sulfuric acid gave tetrachlorocyclopentadienone dimer in 65 percent yield.

EXAMPLE 3

*5,5-Bis(Dimethylamino)-1,2,3,4-Tetrachlorocyclopentadiene*

Hexachlorocyclopentadiene (27.3 grams, 0.1 mole) and dimethylamine hydrochloride (50.4 grams, 0.6 mole) were mixed in 100 milliliters of methanol. After the slow addition of potassium methoxide (33.6 grams, 0.6 mole of potassium hydroxide in 200 milliliters of methanol) under cooling in a salt-ice bath and stirring for 4 days, the potassium chloride was filtered. After evaporation of the solvent, alcohol, 100 milliliters of water and 100 milliliters of ether were added to the residue. The ether layer was separated, washed with water and dried over calcium sulfate. The ether was removed and hexane added to the residual liquid. Upon cooling, 0.3 gram of a solid precipitated from solution and was separated by filtration. The hexane solution was treated with charcoal at room temperature and after filtration, the solvent removed by evaporation. The light brown residual liquid was dissolved in pentane and chromatographed through a 20 millimeter by 5 centimeter neutral aluminum oxide-packed column to give 24.7 grams or 85 percent yield of colorless liquid, $n_D^{20}$ 1.5400. Cooling in Dry Ice gave colorless prisms of 5,5-bis(dimethylamino)-1,2,3,4-tetrachlorocyclopentadiene melting at 33-34 degrees.

Calc'd for $C_9H_{12}Cl_4N_2$: C, 37.24; H, 4.14; N, 9.65. Found: C, 37.28; H, 4.26; N, 9.32.

Hydrolysis of the product of this example with cold aqueous hydrochloric acid also gave tetrachlorocyclopentadienone dimer. This reaction is a general one and the reaction of any of the products of this invention with aqueous mineral acid will yield the tetrachlorocyclopentadienone dimer. Hence the compounds of this invention are useful as intermediates in the preparation of the interesting compound, 3a,4,7,7a-tetrahydro-2,3,3a,4,5,6,7,7a-octachloro-4,7-methanoindene-1,8-dione.

5,5-Dimorpholino-1,2,3,4-tetrachlorocyclopentadiene, a typical compound of this invention, was found to prevent the early damping-off of peas due to Pythium when admixed into the soil at a rate of 50 parts per million. Higher rates gave partial control of tomato early blight.

Other variations of this process will become apparent to one skilled in the art, and the invention is not to be limited to the above-offered illustrative examples. The subject matter which the applicant regards as his invention is particularly pointed out and distinctly claimed as follows:

1. 1,2,3,4 - Tetrahalocyclopentadiene bis-substituted in the 5-position by secondary amino moieties selected from the group consisting of di-lower-alkylamino, diphenylamino, N-phenyl-lower-alkylamino, N-morpholino, N-piperidino, and N-pyrrolidino.

2. A compound according to claim 1 wherein halo is chloro.

3. Compounds according to claim 1 wherein X is di-lower-alkylamino.

4. 5,5 - Dimorpholino-1,2,3,4-tetrachlorocyclopentadiene.

5. 5,5 - Dipiperidino-1,2,3,4-tetrachlorocyclopentadiene.

6. 5,5 - Bis(dimethylamino) - 1,2,3,4-tetrachlorocyclopentadiene.

7. A process for preparing 5,5-bis-substituted-1,2,3,4-tetrahalocyclopentadienes wherein the 5,5-substituents are secondary amino moieties which includes contacting hexahalocyclopentadiene with a secondary amine, and recovering the said 5,5-bis-substituted-1,2,3,4-tetrahalocyclopentadiene from the reaction mixture.

8. A process for preparing 5,5-bis-substituted-1,2,3,4-tetrachlorocyclopentadienes wherein the 5,5-substituents are secondary amino moieties which includes contacting hexachlorocyclopentadiene with a secondary amine, and recovering the said 5,5-bis-substituted-1,2,3,4-tetrachlorocyclopentadiene from the reaction mixture.

9. A process for preparing 5,5-bis-substituted-1,2,3,4-tetrachlorocyclopentadienes wherein the 5,5-substituents are secondary amino moieties which includes contacting hexachlorocyclopentadiene with a secondary amine, in the presence of an unreactive organic solvent.

10. A process for preparing 5,5-bis-substituted-1,2,3,4-tetrachlorocyclopentadienes wherein the 5,5-substituents are selected from the group consisting of di-lower-alkylamino, diphenylamino, N-phenyl-lower-alkylamino, N-morpholino, N-piperidino, and N-pyrrolidino which includes contacting hexachlorocyclopentadiene with a secondary amine compound selected from the group consisting of dilower-alkylamines, diphenylamines, morpholines, piperidines and pyrrolidines, in the presence of an unreactive organic solvent, and recovering the said 5,5-bis-substituted-1,2,3,4-tetrachlorocyclopentadiene from the reaction mixture.

11. The process according to claim 10 wherein the unreactive organic solvent is a lower-alkyl alcohol containing less than four carbon atoms.

No references cited.